INVENTORS
GOSTA R. ENGLUND
MATS E. MATTSON

Jan. 30, 1968  G. R. ENGLUND ET AL  3,366,323
REGISTERING MECHANISM

Filed June 20, 1966  8 Sheets-Sheet 4

INVENTORS
GOSTA R. ENGLUND
MATS E. MATTSON

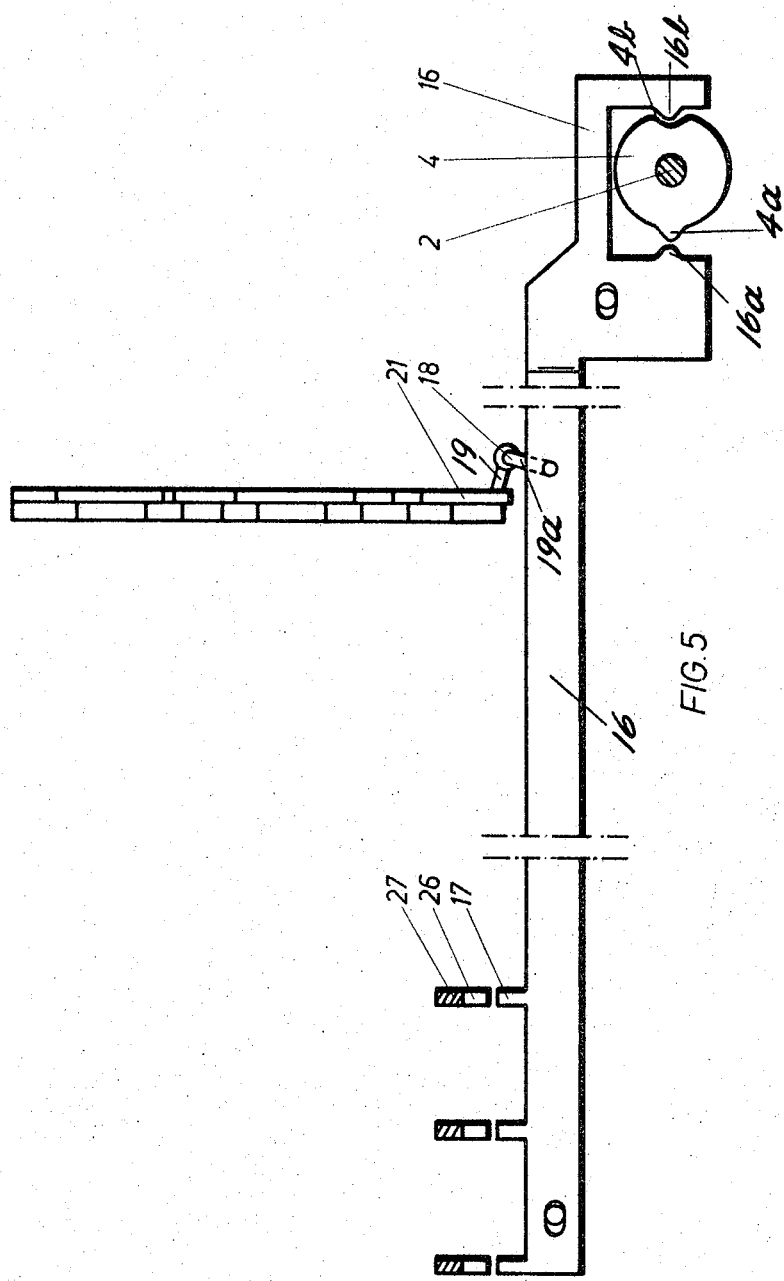

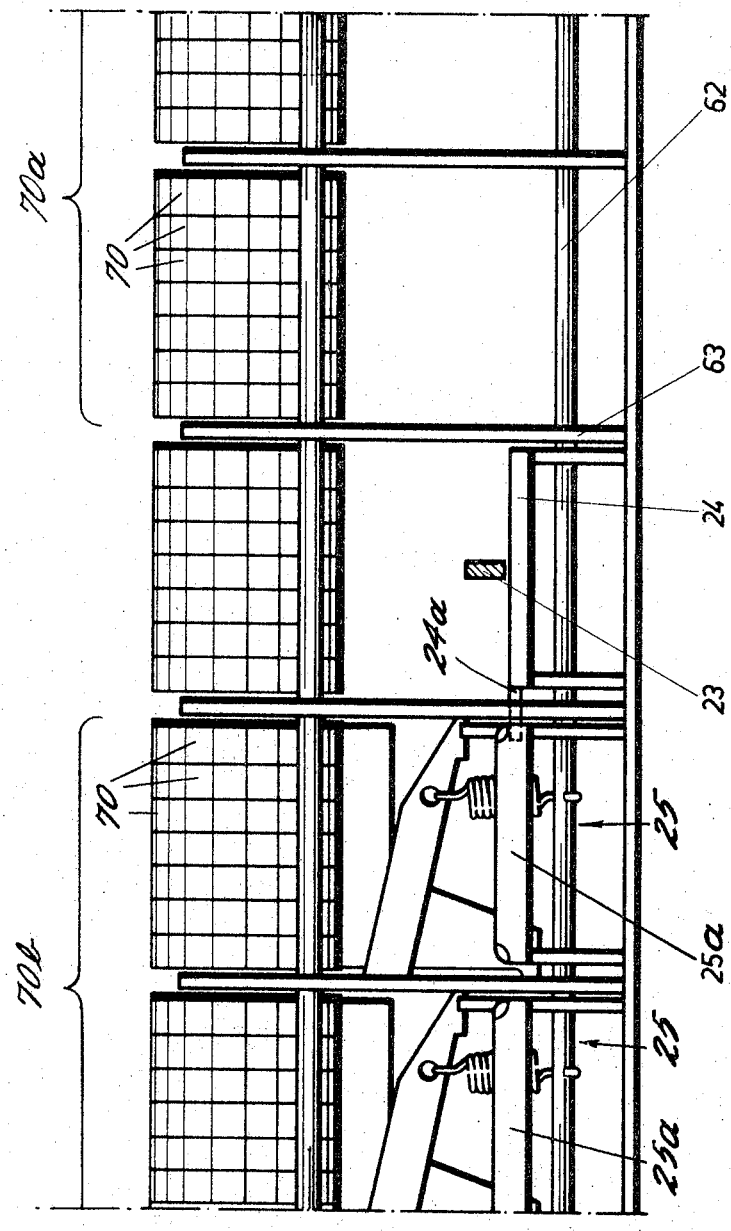

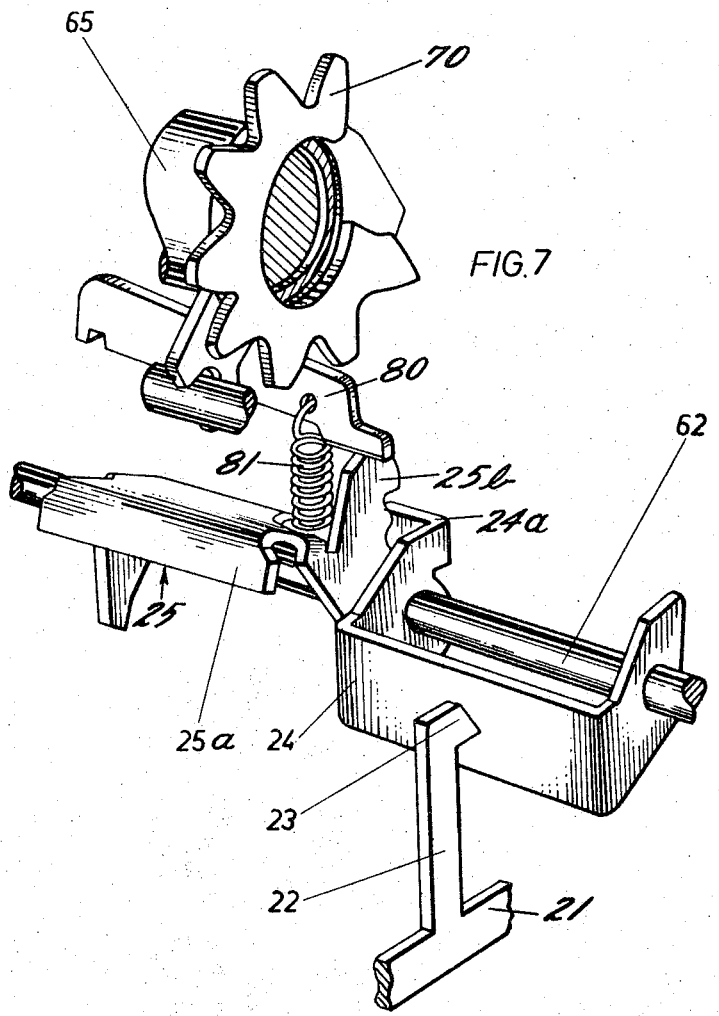

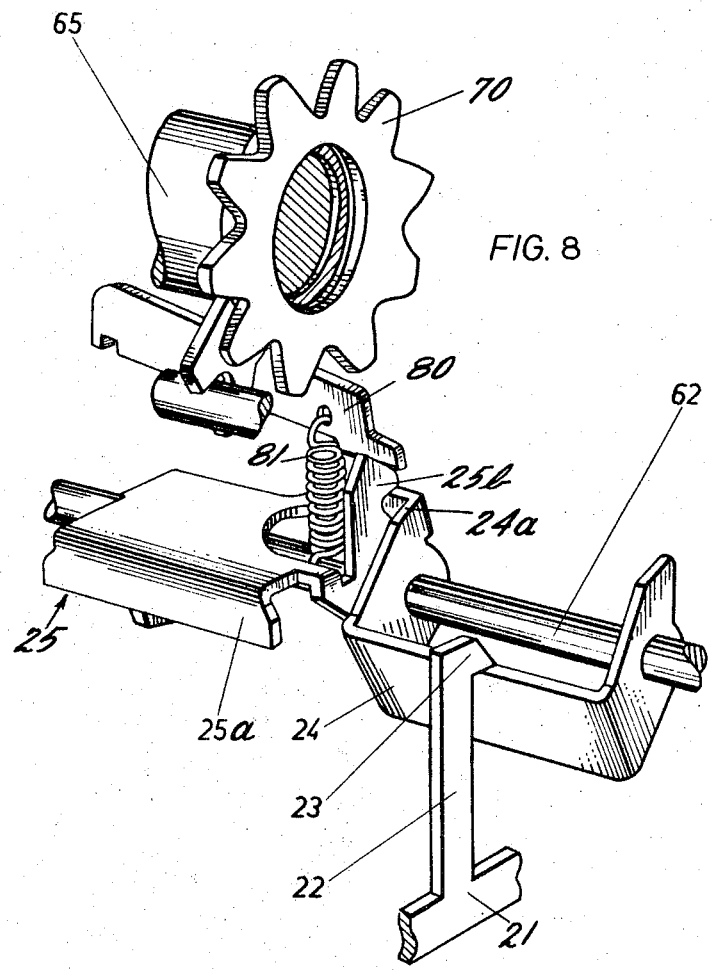

United States Patent Office 3,366,323
Patented Jan. 30, 1968

3,366,323
REGISTERING MECHANISM
Gosta R. Englund, Stockholm, and Mats E. Mattsson, Sollentuna, Sweden, assignors to Svenska Dataregister AB, Solna, Sweden
Continuation-in-part of application Ser. No. 488,057, Sept. 17, 1965. This application June 20, 1966, Ser. No. 558,758
11 Claims. (Cl. 235—60)

ABSTRACT OF THE DISCLOSURE

A registering mechanism for a cash register or similar machine having an amount register and a counter register which are positioned on the same shaft. A preset amount is entered into the amount register in response to actuation of a key. The entering of this amount causes a count to be entered in the lowest order of the counter register to thereby record the number of times that the amount is entered. Significantly the mechanism for entering a count in the lowest order of the counter register corresponds structurally and operatively to the tens transfer mechanism between the higher orders of the counter register.

---

This application is a continuation-in-part of application Ser. No. 488,057 filed on Sept. 17, 1965, now abandoned.

This invention relates to registering mechanism for cash registers or the like.

In the usual operation of such machines, the operator often must use the amount keys corresponding to the price of each of a number of items many times a day and usually a particular register of the machine is assigned to each item. The disadvantage of this is obvious particularly in instances where a small number of items with fixed prices constitute the greater part of sales.

Prior art machines provide means to simplify the above operation by providing means whereby the price of each of a given number of items is registered in response to depression of a single key assigned to the particular item. It is obviously desirable to register the number of times each item is registered as well as the price.

It is accordingly the principal object of the invention to provide simplified means with economy of mechanism to register a count each time the price of an item is registered.

A further object is to register a given amount during a single cycle of the machine in response to depression of a single key and to register a count during said cycle.

A further and more specific object is to provide, on a single shaft, an amount register in which the price of an item is registered and a counter register in which a count is registered each time the machine is cycled in response to depression of a single key.

Another and yet more specific object is to modify the operation of tens transfer mechanism to operate the counter register.

The invention is disclosed as embodied in the cash register fully disclosed in our co-pending application Ser. No. 179,595 filed on Mar. 14, 1962, now Patent No. 3,263,915. Reference is made to said application for a complete disclosure of mechanism and operations herein referred to but not disclosed and/or described in detail.

In accordance with our invention, an amount register comprises a given number of ordinally successive register gears on one of the register gear shafts, and a counter register comprises a given number of ordinally successive register gears on the same shaft.

In practicing the invention, the price of an item is set in the amount keys of the keyboard and then entered in the amount register by an add operation in the usual manner. Thereafter, in response to each depression of a single key assigned to the item, a sub-total cycle of operation for the amount register will be performed. In the sub-total operation, the actuator racks in the forward stroke of the cycle will zeroize the amount register and the amount will be registered in display wheels and also will be printed. In the return stroke of the racks, the value will be re-entered in the amount register and also may be entered in a grand total register. During the above-described cycle, tens transfer means is modified in operation to enter a count of "1" in the units order of the counter register.

When it is desired to know the total of the count in the counter register, another key is depressed to institute a total taking cycle of operation. This cycle will include the above-described sub-total operation for the amount register and a total taking operation for the counter register.

Other advantages and aspects of the invention will be evident from the following description with reference to the accompanying drawings in which:

FIG. 5 is a top plan view of the mode of operation selection means shown in FIGS. 1 and 2.

FIG. 6 is a mechanical schematic of the amount register and the counter register and devices of the invention operable with the tens transfer mechanism.

FIGS. 7 and 8 are perspective views of a tens transfer unit with devices of the invention in normal and in an operated position.

*The amount register and counter register units*

Figure 3:
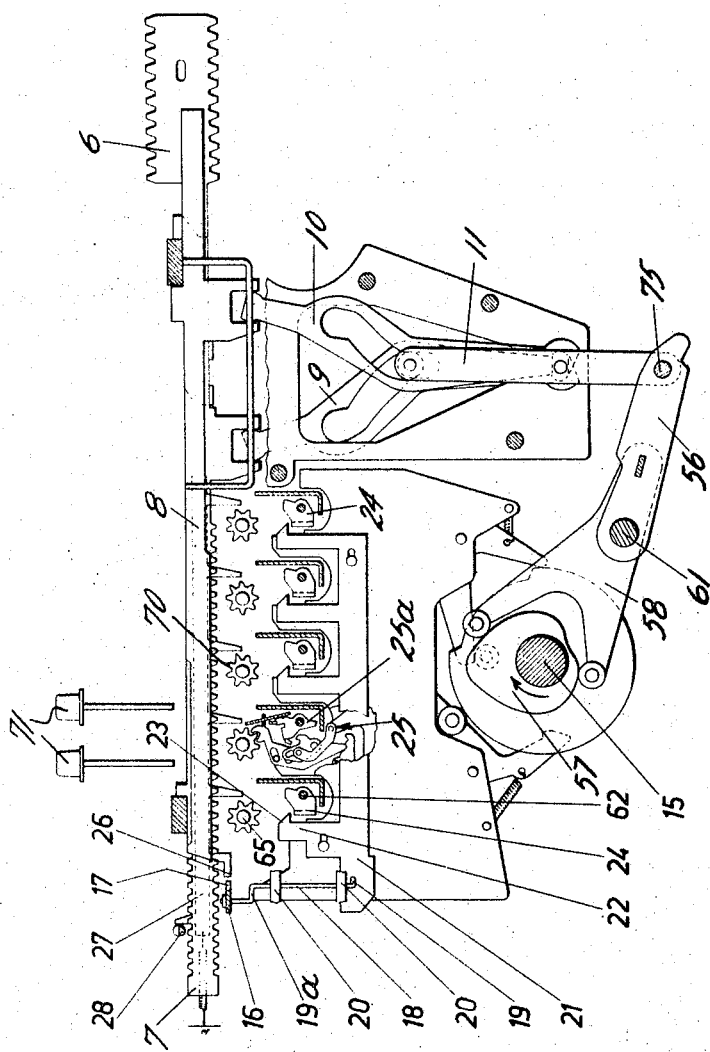
FIG. 3 is a section taken on the dot-dash line 3—3 of FIG. 1 showing the differential assembly which is operable in conjunction with a depressed one of the digit keys, two of which are shown schematically, of an amount column to register the amount.

A register unit comprising an amount register 70a and a counter register 70b (FIGS. 1, 6) are mounted on a common shaft 65 (FIGS. 3, 7, and 8). Five shafts and register units are shown in the drawings.

These register units 70a–70b may each be assigned to a different item and each may be selected by a related selection key for the partcular mode of machine operation performed in response to depression of any one of a plurality of function keys. Each register unit is controlled in like manner in the machine operation.

Figure 1:
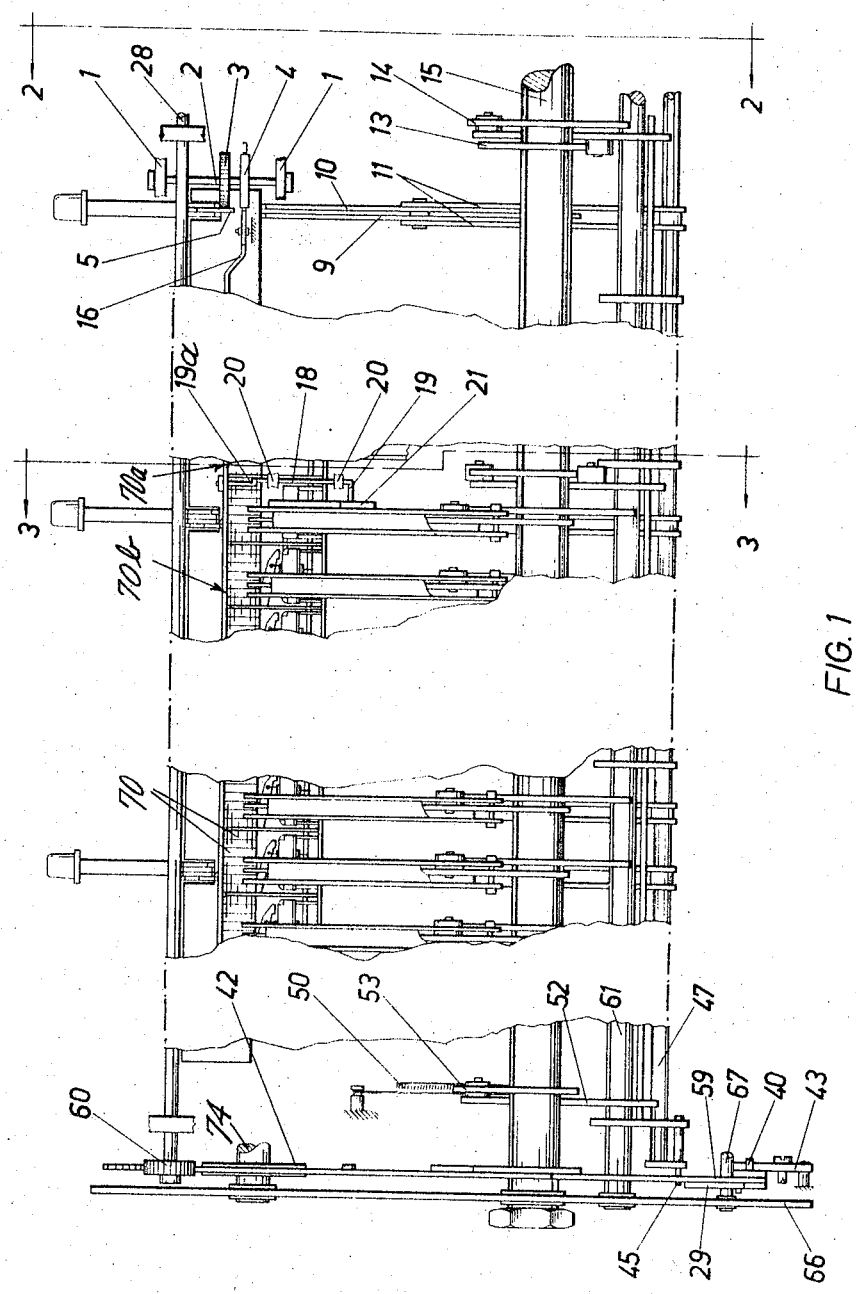
FIG. 1 is a front elevation of a part of the cash register embodying the invention with parts broken away.

Seven register gears 70 are shown in each order of a register unit 70a–70b (FIGS. 1, 6). The register unit may be shifted longitudinally to one of seven selected positions to bring a corresponding gear of each order into relation with a registering mechanism, later described for each order. Accordingly, there are seven register units on each shaft 65. Each register unit is controlled identically with respect to the registering mechanism and to the devices of the invention. The operation therefore will be understood with reference to a single register gear 70 in each order as shown in FIGS. 7 and 8.

With reference to FIG. 6, it will be seen that there is an intermediate order in a register unit between amount register 70a and counter register 70b, and this order will be inactive with respect to the devices of the invention. It will be understood that amount register 70a will include the number of orders needed for entry of an amount and that counter register 70b will include the number of orders needed for a maximum count.

Digital registration differential assemblies

The digital registering mechanism for each order of a register unit 70a–70b (FIGS. 1, 6) comprises a differential assembly (FIG. 3) which is controlled by a column of amount keys 71 for the digits 0–10 and of which two are shown in the drawing. The differential assembly includes an actuator rack 7 and a complementary slide 8 that are slidably mounted for movement parallel to each other. The edges of rack 7 and slide 8 are provided with lugs that are adapted to be moved into engagement with opposite sides of the stem of a depressed amount key 71. The lower toothed edge of rack 7 is adapted to be engaged by a register gear 70 when a register unit 70a–70b is raised.

Indicating and printing means (not shown) are controled in dependence on the setting to which actuator rack 7 and complementary slide 8 are moved. Means for controlling the indicating and printing means comprises an indicator rack 6 slidably mounted between rack 7 and slide 8. Indicator rack 6 is loosely coupled to rack 7 and slide 8 by suitable lugs on rack 6 that engage shoulders or lugs on rack 7 and slide 8.

In the following description, "forward" stroke in a reciprocatory cycle of operation designates the first stroke of the cycle regardless of the direction with respect to the machine.

In a registering cycle of operation, actuator rack 7 is moved to the right in a forward stroke to a position where it is arrested by the stem of a depressed amount key 71, and complementary slide 8 is moved to the left in a forward stroke to a position complementary to that of rack 7. During this movement, the lugs on indicator rack 6 are engaged by rack 7 and slide 8 to move rack 6 from its previous position to a position corresponding to the present setting of rack 7 and slide 8. When rack 7 and slide 8 are restored to their normal positions, indicator rack 6 will remain in the adjusted setting inasmuch as rack 7 and slide 8 move away from the lugs of rack 6.

Drive means for the digital registration differential assemblies

Drive means for the differential assembly 6, 7 and 8 (FIG. 3) of each order of a register unit 70a–70b (FIGS. 1, 6) includes a pair of vertically disposed arms 9, 10 coupled at their upper ends respectively to rack 7 and slide 8. Arms 9, 10 have common fixed pivotal mounting at their lower ends and each is provided with a cam slot. The two slots are engaged by a roller between the upper ends of a depending pair of links 11. When the links are raised from normal position (FIG. 3) the upper ends of arms 9, 10 will be moved toward one another thereby moving rack 7 toward the right and slide 8 toward the left.

A drive unit for raising and lowering links 11 for the differential assemblies for amount register 70a of the unit includes a pair of spaced arms 56 (FIGS. 3, 4) suitably tied together and pivotally mounted at one of their ends on a shaft 61. A shaft 75 extends between the other ends of arms 56 and the lower ends of links 11 are pivotally mounted on the shaft. To simplify the drawings, only a single pair of links 11 for one of the differential assemblies is shown. A cam follower 58 is secured to one of the arms 56 and engages positive action cam means 57 including a pair of cams mounted on main drive shaft 15 and of which only one is shown. During a machine cycle, cam means 57 rocks follower 58 counterclockwise and return thereby raising and lowering drive links 11 of amount register 70a.

A drive unit for raising and lowering links 11 for the differential assemblies for counter register 70b includes a pair of spaced arms 49 (FIG. 4) suitably tied together and pivotally mounted at one of their ends on shaft 61. A shaft 47 extends between and through the other ends of crank 49 and is rotatably mounted therein. The lower ends of links 11 are pivotally mounted on shaft 47. To simplify the drawings only a single pair of links 11 for one differential assembly is shown. A cam follower 52 is secured to the assembly of arms 49 and includes a roller 51 which engages a cam 53 fast on drive shaft 15. A spring 50 operates to bias drive unit 49—49 and follower 52 counterclockwise to engage roller 51 with cam 53.

Means is operable to couple drive unit 49—49 for movement with drive unit 56—56. The coupling means includes an arm 55 mounted on shaft 61 and fixed for movement with arms 56. The left end 48 (FIG. 4) of shaft 47 is cut to a semicircular cross section and engages a recess 54 in the end of arm 55. The top of recess 54 is defined by a short nose 54a and the bottom is defined by a long nose 54b.

Figure 4:
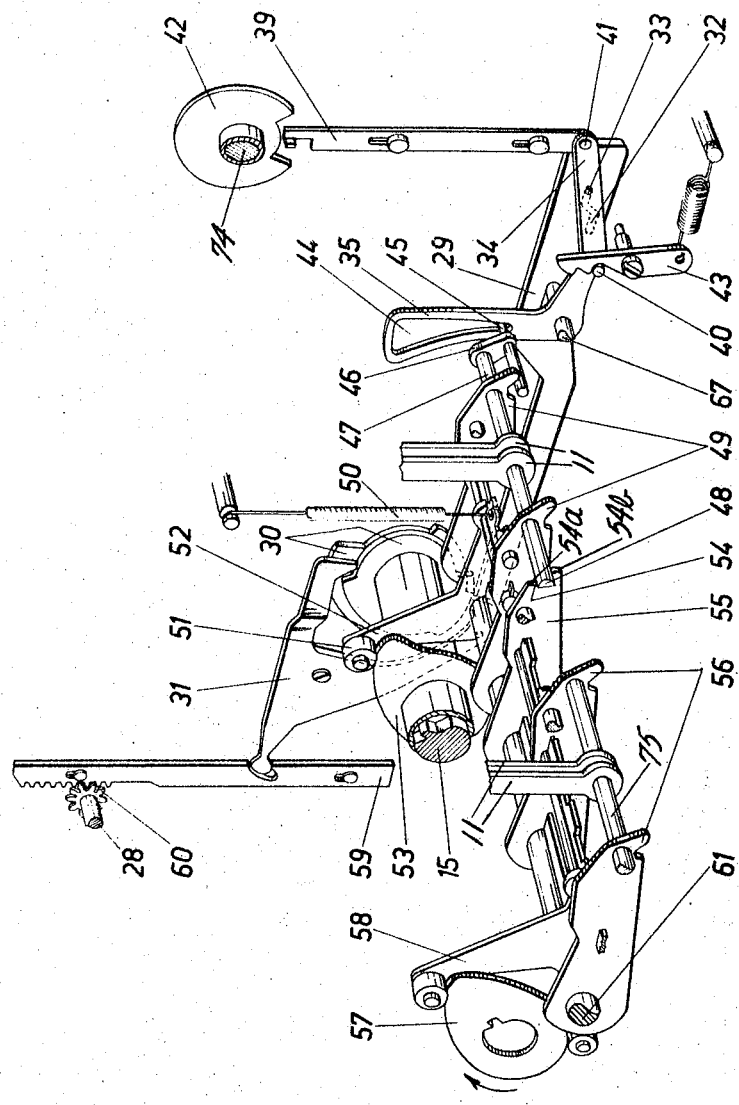
FIG. 4 is a perspective view of the delay mechanism for the differential assemblies of the counter register.

When shaft 47 is in the counterclockwise position of FIG. 4, shaft end 48 is beneath and in the path of short nose 54a. When shaft 47 is adjusted clockwise, as later described, end 48 is moved from beneath and out of the path of nose 54a. End 48, however, regardless of the adjustment will always be above and in the path of long nose 54b. With the above in mind, the operation will be considered with shaft 47 in its two adjusted positions.

With shaft 47 counterclockwise (FIG. 4) in full coupling position, drive unit 49—49 will be rocked counterclockwise and return in unison with drive unit 56—56. In the counterclockwise movement, follower 51–52, under the urge of spring 50 and the drive transmitted by coupled unit 56—56, will follow the contour of cam 53 as follower 58 is driven by cam means 57. That is both followers 52 and 58 are transmitting the drive. However, in the return movement, follower 58 alone is effective, the drive being transmitted to unit 49—49 by nose 54a of arm 55 in engagement with end 48 of shaft 47. This return drive by follower 58 to the exclusion of follower 52 results from the design of cam 53 which dwells until near the end of the cycle to delay the return of drive unit 49—49 with respect to drive unit 56—56 when shaft 47 is in uncoupled clockwise position from the coupled position of FIG. 4.

When shaft 47 is in uncoupled position, shaft end 48 will not be in the path of nose 54a when arm 55 is restored clockwise with unit 56—56. While unit 56—56 is being restored, unit 49—49 will be held counterclockwise by spring 50 while cam 53 dwells. Near the end of the cycle, after unit 56—56 is restored, cam 53 will rock follower 52 clockwise thereby restoring unit 49—49. This delay operation is for a purpose later described.

Means for adjusting shaft 47 includes a test disc 42 (FIGS. 1, 4) which is set by the function control means. A vertically disposed feeler arm 39 has its upper free end adapted for registration with a high edge or with a low edge of disc 42. Arm 39 is provided with longitudinal slots engaging fixed pins and is thereby adapted for vertical movement.

Means for vertically adjusting arm 39 includes a link 34 having its right end pivotally connected at 41 to the lower end of arm 39 and having its left end pivotally connected by a pin 40 to the end of a rightwardly extending arm of a crank 35 pivotally mounted on a shaft 67. Crank 35 has an arcuate slot 44 which is engaged by a pin 45 at the end of a crank 46 secured at the right end of shaft 47.

Link 34, intermediate its ends, is provided with a pin 33 which engages an S-shaped cam slot 32 having an upper and a lower leg adjacent the right end of a slide 29. Slide 29 is supported by shaft 67 which engages a slot in the slide and by pivotal connection at its left end with a cam follower 31 engaging a pair of cams 30.

In FIG. 4, follower 31 is in normal clockwise position, slide 29 is to the left with the upper leg of cam slot 32 engaging pin 33 link 34 is rocked counterclockwise about pin 33, arm 39 is raised with its upper end adjacent the lower part of disc 42, and crank 35 is rocked clockwise where it is held by detent 43 engaging pin 40. With crank 35 clockwise, crank 46 and shaft 47 is rocked counterclockwise to couple drive units 49—49 and 56—56 for simultaneous return movement.

In the first part of a machine cycle, with the parts in the above-described position of FIG. 4, cams 30 will rock follower 31 counterclockwise a step of movement. This will move slide 29 just far enough to the right to engage the lower leg of cam slot 32 with pin 33. As a result, link 34 will be rocked clockwise about pin 40 thereby lowering arm 39 from the recess defined by the high and low parts of disc 42. From the above it will be seen that crank 35 will remain clockwise with shaft 47 in coupled position.

During the above described step of movement, follower 31 will lower a rack 59 thereby rotating a gear 60 and a shaft 28 a step of movement. Shaft 28 extends across the front of the machine (FIG. 1) and operates in conjunction with restore slides 27 (FIGS. 3, 5), one of which is associated with each differential assembly 6, 7, 8 of register units 70a–70b. Each slide 27 extends parallel and adjacent a side of the associated differential assembly and is spring urged ot the left (FIG. 3). Normally, however, shaft 28 engages an upstanding lug on each slide 27 and holds said slides to the right as shown in FIG. 3.

When slides 27 are held to the right, means is operable to block racks 7 from forward stroke movement to the right for the start of their operation in the cycle. When the slides are released and moved a step to the left by their springs, racks 7 will be released for operation. To release slides 27, shaft 28 is cut away along its length so that it may be rotated to present a flat side to the slides to permit the left step of movement. Reference is made to U.S. Patent 3,103,309 for a complete disclosure of the control operations in connection with reset slides 27.

The aforedescribed step of shaft 28 is not great enough to bring its flat side to release slides 27. However, further in the cycle, cams 30 (FIG. 4) will rock follower 31 a further step counterclockwise thereby rotating shaft 28 to a position to release slides 27. In this step of movement, slide 29 will be moved further to the right. This movement will be permitted by the length of the lower leg of cam slot 32 without changing the adjustment of the parts.

When slides 27 are released, the differential assemblies 6, 7 and 8 will be operated by the simultaneous counterclockwise movement of drive units 49—49 and 56—56, racks 7 moving to the right and slides 8 to the left. After this, follower 31 and the connected parts will be restored in a single step of movement. When slide 29 is restored to the left, the upper leg of cam slot 32 will again engage pin 33 and link 34 will be rocked counterclockwise about pin 40 to raise arm 39 in the recess of disc 42 as shown in FIG. 4. Shaft 47, therefore, will remain in coupled position and drive units 49—49 and 56—56 will be restored simultaneously clockwise to restore differential assemblies 6, 7, and 8.

In an operation later described, shaft 47 is adjusted to uncoupled position so that drive unit 49—49 will be delayed in return movement as previously described. In this operation, the function control means is operable to set disc 42 from the position of FIG. 4 so that its high edge is in the path of the upper end of arm 39 as follows.

In the first part of the machine cycle, the parts are adjusted as previously described. Therefore, slide 29 will be to the right, the lower leg of slot 32 will engage pin 33, link 34 will be clockwise about pin 40 from the position of FIG. 4, and arm 39 will be lowered from the recess of disc 42. When arm 39 is lowered, the function control means will rotate disc 42 to present its high edge to the upper end of arm 39. At this time there is no operation to move shaft 47 from coupled to uncoupled position; however, the adjustment of disc 42 has conditioned the parts.

After drive units 49—49 and 56—56 have completed their counterclockwise movement, follower 31 and the connected parts will be restored as described. Slide 29 therefore will be restored to the left to reengage the upper leg of slot 32 with pin 33. In this movement, arm 39 will be raised slightly and then arrested by engagement with the high edge of disc 42. Accordingly, link 34 will be rocked clockwise about its pivot 41 at the bottom of arm 39. As a result, crank 35 will be rocked counterclockwise from the position of FIG. 4 thereby rocking shaft 47 clockwise to uncoupled position. After this, drive unit 56 will be restored clockwise independently of drive unit 49 which will be restored later near the end of the cycle. Thereafter, during each cycle, with disc 42 in uncoupling position, shaft 47 will be adjusted to coupled position and then to uncoupled position for the restore movement of drive units 49—49 and 56—56 wherein the movement of unit 49—49 is delayed.

*Function or mode of operation differential assemblies*

Figure 2:
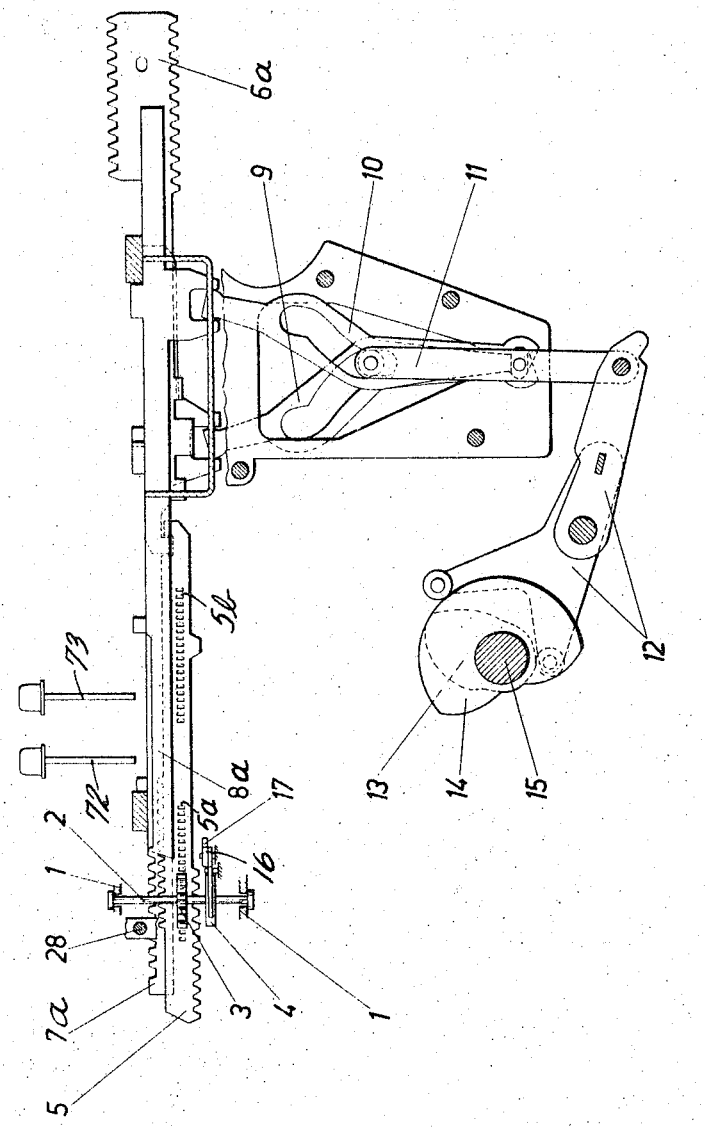
FIG. 2 is a section taken on the dot-dash line 2—2 of FIG. 1 showing the differential assembly which is operable in conjunction with a depressed one of the function keys shown schematically to select the type or mode of operation of the machine.

A differential assembly controlled by a column of function keys including keys 72, 73 (FIG. 2) is substantially like the previously described differential assemblies controlled by the amount keys 71. (FIG. 3.) However, since the assembly does not operate to enter amounts into register units 70a–70b the lower edge of rack 7a (FIG. 2) does not have teeth for engagement by a register gear 70.

Indicator rack 6a through teeth at its rear adjusts a wheel (not shown) to indicate the selected function and through a suitable gear train (not shown) adjusts a shaft 74 and control disc 42 (FIG. 4) to control a function or mode of operation later described. Furthermore, the left end of rack 6a (FIG. 2) is coupled to a function control slide 5 which is therefore adjusted with the rack.

Slide 5 is provided with a longitudinal series of spaced apertures 5a which are in effect drive teeth which are engaged by a gear 3 fast on a vertical shaft 2 (FIGS. 1, 2, and 5) which is rotatably mounted in bearings 1. A cam disc 4 is fast on shaft 2 and operates in connection with the devices of the invention as later described. Apertures 5a and a second row of apertures 5b adjust means for determining the times during an operating cycle at which means is operable to raise and lower a register unit 70a–70b into and out of engagement with actuator racks 7.

*Drive means for the function or mode of operation differential assembly*

Drive means for the function control differential assembly 6a, 7a, 8a comprises a pair of arms 9 and 10, a pair of links 11, and a drive unit 12 including a follower engaging a pair of cams 13, 14 on main drive shaft 15. These parts operate to drive the assembly substantially in accordance with the description of drive unit 56—56 (FIGS 3, 4) for the assemblies for the amount registers 70a. The timing, however, is different because the function must be selected before operation of the registration differential assemblies.

*The tens transfer actuators for the counter register*

Tens transfer means designed for the usual operation to register a unit in each higher order register gear 70 in response to movement of the next lower order gear from "9" to "0" has been modified in operation with respect to the lowest or units order of counter register 70b (FIG. 6). In accordance with the invention, means is provided to operate a tens transfer unit for the units order of register 70b to register a count of "1" in said units order each time a sub-total is taken of an amount that has been preset in amount register 70a.

Each tens transfer unit 25 includes a bracket or bail 25a (FIGS. 3, 6, 7, and 8) rockably mounted on a common shaft 62. With reference to FIG. 6, there is a transfer unit for each order of counter register 70b, but none for amount register 70a wherein a tens transfer operation is never indicated. Moreover, there is neither digital nor tens transfer mechanism for the intermediate or dummy order between registers 70a–70b. In this order, however, there is a bracket or drive bail 24, later described, rockably mounted on shaft 62. From the above, it will be seen that the register gears of the dummy order have no function and may be removed from the machine.

The following is a brief description of the operation of the tens transfer mechanism including the mechanism for actuating the lowest order of a counter register. This description is all that is necessary for an understanding of the invention.

Brackets 25a are adjustable to the normal clockwise position of FIGS. 3, 7 and to the operated counterclockwise position of FIG. 8. Brackets 25a are each yieldably held in adjusted position by a detent arm 80 urged by a spring 81 into engagement with one or the other inclined edges at the end of an upstanding arm 25b of the bracket. Shaft 62 with brackets 25a are raised and lowered as a unit with register gears 70 for engagement and disengagement of the gears with racks 7. See especially aforementioned copending application Ser. No. 179,595 now U.S. Patent 3,263,915, for a more complete description of this mechanism. When a rack 7 rotates a gear 70 from "9" to "0", means is operable to rock bracket 25 of the next higher order counterclockwise to the position of FIG. 8. When gears 70 and brackets 25a have been lowered, means is operable to register a tens transfer unit in the gears 70 having the related brackets 25a in counterclockwise adjusted position. If a gear 70 receiving a transfer unit stands at "9," the passage of the gear to "0" will rock the next higher order bracket and this will be followed by a transfer operation in that order etc. When the tens transfer operations are completed, means is operable to restore all operated brackets 25a to normal clockwise position.

Bracket 24 in the dummy order has a leftward extending coupling lug 24a which engages a recess at the rear of arm 25b of lowest order bracket 25a. Accordingly, if bracket 24 is rocked counterclockwise it will rock coupled bracket 25a in like direction to operated position. Furthermore, bracket 24 will be restored when coupled operated bracket 25a is restored. The control means for brackets 24 will be described in the following section.

Control devices

Means for controlling brackets 24 comprises a slide 21 (FIGS. 3, 5, 7, and 8) which has suitable slot and pin mounting for movement front and rear of the machine as shown in FIG. 3. Slide 21 includes an upstanding arm 22 for each bracket 24 and each arm 22 includes a rearwardly extending hook end 23. When slide 21 is in rear adjusted effective position (FIG. 3) hook ends 23 will be located immediately above the front edge of the respective brackets 24. When slide 21 is in front adjusted position, hooks 23 will be forward of brackets 24 and out of their path of movement when the register units 70a–70b are moved toward the racks 7.

Means for adjusting slide 21 includes a vertically disposed crank shaft 18 (FIGS. 3, 5) fulcrumed in suitable bearings 20. The lower end of crank shaft 18 is bent to form a leftwardly extending crank arm 19 which extends through an opening adjacent the front of slide 21. The upper end of shaft 18 is bent to form a forwardly extending crank arm 19a having its end bent upwardly through an opening in a slide 16 which extends transversely across the front of the machine immediately below racks 7 and forwardly of restore slides 27. Slide 16 has slot and pin mounting for longitudinal adjustment and includes rearwardly extending lugs 17 which are adapted to be moved into and out of the forward path of movement of depending lugs 26 of the respective restore slides 27 of differential assemblies 6, 7, 8 of counter register 70b.

Means for adjusting slide 16 includes the aforenoted cam disc 4 (FIGS. 1, 2, and 5) which is adjusted by slide 5 (FIG. 2) of the function control means. Slide 16 is recessed at its right end (FIG. 5) to contain cam 4. Cam 4 includes a lobe 4a and an opposed recess 4b. When cam 4 is in the position of FIG. 5, lobe 4a engages a lobe 16a of slide 16 and recess 4b is engaged by a lobe 16b of the slide. Accordingly, slide 16 is held in the left adjusted position shown in FIG. 5.

With slide 16 in left adjusted position, crank shaft 18 will be rotated clockwise (FIG. 5) and slide 21 will be in rear adjusted position wherein hooks 23 are above the front edges of brackets 24 as shown in FIG. 3. Furthermore, lugs 17 of slide 16 will be immediately in front of lugs 26 of the related restore slides 27. When cam 4 is rotated a step to disengage lobe 4a from lobe 16a and recess 4b from lobe 16b, slide 16 will be moved a step to the right from the position of FIG. 5. Accordingly, lugs 17 will be moved from the forward path of lugs 26 of slides 27. Furthermore, crank shaft 18 will be rotated counterclockwise to move slide 21 forwardly thereby moving hooks 23 from above the front edges of brackets 24.

Operation

The following operation of the devices of the invention will be described in connection with the control of one of the register units 70a–70b (FIGS. 1, 6) which has been assigned to the sale of a particular item. The price of the item is entered in amount keys 71 (FIG. 3) related to the orders of amount register 70a. Then a key (not shown) is depressed to select the assigned register unit 70a–70b and an add key (not shown) is depressed to enter the amount in amount register 70a. These operations are well known and need no further explanation. However, during the add operation, function control slide 5 (FIG. 2) will be adjusted to rotate cam 4 from the position of FIG. 5. Therefore slide 21 (FIGS. 3, 5) will be moved forwardly to ineffective position so that a count will not be registered in counter register 70b. The machine is now ready for operation as follows.

Each time the item is purchased, the register selection key is depressed and then key 72 (FIG. 2) is depressed to initiate a machine cycle. In this cycle, prior to operation of registration assemblies 6, 7, 8 (FIG. 3), function control assemblies 5, 6a, 7a, 8a (FIG. 2), will be operated under control of depressed key 72 and slide 5 will operate means to select a sub-total operation wherein register gears 70 are raised to engagement with racks 7 prior to operation of registration assemblies 6, 7, 8 and are lowered after the assemblies are restored. As a result, amount register 70a will first be zeroized and then the amount will be reentered.

When slide 5 is operated to select the sub-total operation, cam 4 will be rotated to the position of FIG. 5 wherein slides 16 and 21 are adjusted to effective position. Accordingly, when shaft 28 (FIGS. 1, 3, and 4) releases restore slides 27, slides 27 will be blocked from forward movement by lugs 17 (FIG. 5). As a result, racks 7 of counter register 70b will be blocked from rearward movement and will thus be ineffective with respect to engaged register gears 70 of counter register 70b.

When slide 21 is adjusted to effective position, as described before, hooks 23 will be above the front edges of brackets 24 as shown in FIG. 3. Therefore, when register unit 70a–70b is raised for the above-described sub-total operation for amount register 70a, the upper front edge of bracket 24 will engage the related hook 23. Therefore, bracket 24 and the coupled tens transfer bracket 25a will be rocked counterclockwise to the position of FIG. 8. Accordingly, after register unit 70a–70b is lowered, the tens transfer means will be operated to enter a single count in the units order of counter register 70b.

In each cycle of operation as described above, it will be seen, that a sub-total of amount register 70a will operate to print the amount of the item on the purchaser's receipt; however, the amount in counter register 70b will not be printed because related racks 7 are blocked.

Means in a cycle in response to depression of key 73 is operable to take a total from counter register 70b while taking the aforedescribed sub-total of amount register 70a. This operation would be performed, for example, at the end of a working day.

In this cycle, prior to operation of registration assemblies 6, 7, 8, function control assemblies 5, 6a, 7a, 8a (FIG. 2) will operate under control of depressed key 73 and slide 5 will operate to select a sub-total operation wherein register gears 70 are raised and lowered as previously described. Function control slide, however, will adjust cam 4 from the position of FIG. 5 and slide 6 will adjust disc 42 from the position of FIG. 4. As a result, a sub-total will be taken from only amount register 70a whereas a total will be taken from counter register 70b as follows.

It will be recalled, that when disc 42 is adjusted from the position of FIG. 4, drive unit 49—49 for registration assemblies 6, 7, 8 for counter register 70b will be uncoupled from drive unit 56—56 for registration assemblies 6, 7, 8 for amount register 70a, and will therefore be delayed in its clockwise return movement. Furthermore, when cam 4 is adjusted from the position of FIG. 5, racks 7 of the counter register assemblies will not be blocked. As a result, when drive units 49—49 and 56—56 are rocked counterclockwise simultaneously, both amount register 70a and counter register 70b will be zeroized. When drive unit 56—56 is restored clockwise, the amount will be reentered in amount register 70a. The restore movement, however, of uncoupled drive unit 49—49 will be delayed until register gears 70 have been lowered from engagement with racks 7. Therefore, the amount totaled from counter register 70b will not be re-entered. From the above, it will be seen that the total taken from the counter register 70b and the sub-total taken from the amount register will be printed.

It will be understood that the invention is not limited to the particular application and use herein disclosed, and therefore is to be restricted only as necessitated by the spirit and scope of the appended claims.

We claim:

1. In a machine of the character described having, an amount register;
differential actuators for said register;
cyclically operable drive means for said actuators; and
selection means for controlling said actuators to enter a selected amount in said register;
a counter register including an ordinal series of gear units;
tens transfer means for each successive higher order gear unit;
an actuating means for the lowest order gear unit comprising mechanism structurally and operatively corresponding to said tens transfer means;
control means operable to cause said actuators in a cycle of operation of said drive means to zeroize said amount register and then to re-enter said selected amount; and
means operable during said readout cycle to operate said registering means to enter a count of "1" into said lowest order of said counter register.

2. In a machine of the character described:
a register unit comprising
an amount register and a counter register,
each of said registers including an ordinal series of gear units, and
a common shaft on which said registers are mounted;
a differential actuator for each gear unit;
cyclically operable drive means for said actuators;
selection means for controlling said actuators to enter a selected amount in said amount register;
a counter actuator for the lowest order gear unit of said counter register;
control means for causing the differential actuators of said amount register in a cycle of operation of said drive means to zeroize said register and then to re-enter said selected amount, and for disabling the differential actuators for said counter register during said readout cycle; and
means operable during said readout cycle to operate said counter actuator to enter a count of "1" in said counter register.

3. The invention according to claim 2 wherein:
said differential actuators comprise reciprocatory racks operable by said drive means in forward and return strokes during each cycle; and
said disabling means comprises
means for blocking forward stroke movement of the racks of said counter register.

4. The invention according to claim 3 including
tens transfer means for each successive higher order gear unit of said counter register; and
wherein said counter actuator comprises mechanism structurally and operatively corresponding to said tens transfer means.

5. The invention according to claim 4 wherein:
said control means is operable to move said register unit into and out of engagement with said actuator racks, and
said movement of said register unit is operable to operate means to cause operation of counter actuator.

6. The invention according to claim 5 wherein:
said means operable by movement of said register unit comprises a drive bail operable upon movement of said register unit into engagement with said actuator racks.

7. The invention according to claim 6 wherein:
said counter actuator includes a bail; and
said drive bail is coupled to said actuator bail.

8. The invention according to claim 7 including:
a hook arm adjustable out of and into position to rock said drive bail upon movement of said register unit into engagement with said actuator racks.

9. The invention according to claim 3 wherein:
said control means is operable to move said unit into and out of engagement with said actuator racks; and
said movement of said register unit causes operation of said counter actuator.

10. The invention according to claim 3 including:
a second control means operable in a cycle of said drive means for controlling the differential actuators in a forward stroke to zeroize both said amount register and said counter register, for controlling said differential actuators of said amount register to re-enter said amount in their return stroke, and for controlling said differential actuators of said counter register to operate idly in their return stroke.

11. The invention according to claim 10 wherein:
said drive means is operable to drive the actuator racks for said amount register and said counter register simultaneously in forward stroke operation, and to drive said actuator racks of said counter register in return stroke operation subsequent to return stroke operation of said actuator racks of said amount register; and said second control means is operable to move said register unit into engagement with said actuator racks prior to forward stroke operation, and out of engagement subsequent to the return stroke of said amount register racks and prior to the return stroke of said counter register racks.

References Cited

UNITED STATES PATENTS

| 3,021,053 | 2/1962 | Runde et al. | 235—60 |
| 3,049,289 | 8/1962 | Borutzke et al. | 235—60 |
| 3,061,183 | 10/1962 | Jackson et al. | 235—60 |

RICHARD B. WILKINSON, *Primary Examiner.*

S. A. WAL, *Assistant Examiner.*